United States Patent
Boland

(10) Patent No.: US 8,826,485 B2
(45) Date of Patent: Sep. 9, 2014

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 384 days.

(21) Appl. No.: 13/266,572

(22) PCT Filed: Apr. 27, 2009

(86) PCT No.: PCT/EP2009/055080
§ 371 (c)(1), (2), (4) Date: Oct. 27, 2011

(87) PCT Pub. No.: WO2010/124718
PCT Pub. Date: Nov. 4, 2010

(65) Prior Publication Data
US 2012/0054977 A1    Mar. 8, 2012

(51) Int. Cl.
  *B60S 1/38* (2006.01)
  *B60S 1/40* (2006.01)

(52) U.S. Cl.
  CPC ........ *B60S 1/3877* (2013.01); *B60S 2001/4054* (2013.01); *B60S 1/3808* (2013.01); *B60S 2001/3836* (2013.01); *B60S 1/3849* (2013.01)
  USPC .................. 15/250.201; 15/250.48; 15/250.43

(58) Field of Classification Search
  CPC ........ B60S 1/38; B60S 1/3877; B60S 1/3808; B60S 1/3879
  USPC ........... 15/250.48, 250.201, 250.361, 250.43, 15/250.44, 250.451–250.454
  See application file for complete search history.

(56) References Cited

U.S. PATENT DOCUMENTS

| 2,939,165 A * | 6/1960 | Ryck ........................ 15/250.452 |
| 2007/0226941 A1* | 10/2007 | Kraemer et al. ......... 15/250.201 |
| 2008/0150193 A1 | 6/2008 | Walworth et al. |
| 2008/0201893 A1 | 8/2008 | Valde et al. |

FOREIGN PATENT DOCUMENTS

| DE | 10025630 A1 | 12/2001 |
| WO | WO 02/087935 A | 11/2002 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, the wiper blade comprising a wiper element which can be placed in abutment with a windscreen to be wiped, which wiper blade includes a central longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end thereof, with the special feature that the groove extends in downward direction beneath the longitudinal strip for forming at least two longitudinal hollow channels on opposite sides of the wiping element, the channels each being defined by the longitudinal strip and a bottom of the groove.

Figure 1:
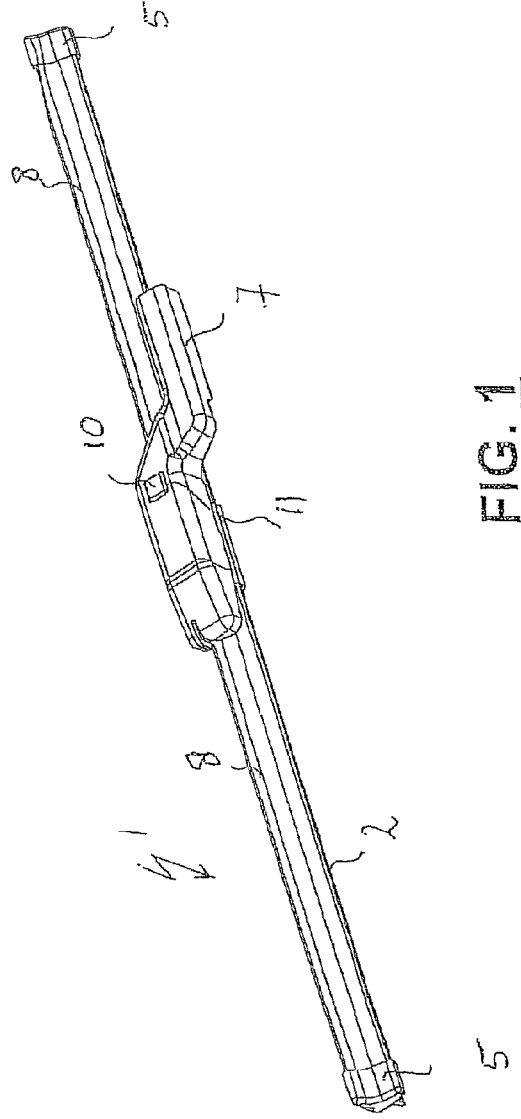
Figure 1:
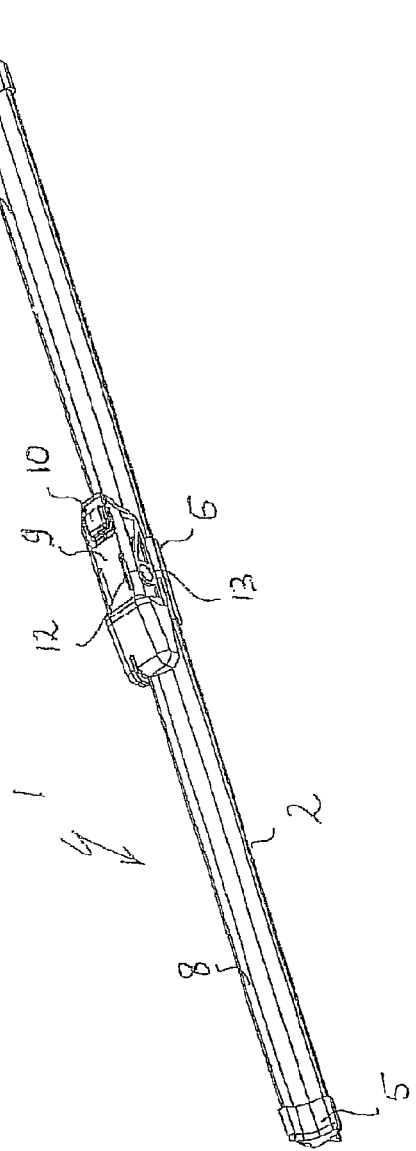

5 Claims, 2 Drawing Sheets

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, the wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end thereof.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature.

SUMMARY OF THE INVENTION

An object of the invention is to provide an improved windscreen wiper device.

In order to accomplish that objective, a windscreen wiper device of the type referred to in the introduction is characterized according to the invention in that the bottom is provided with stop surfaces on opposite sides of the wiping element, and wherein the stop surfaces limit an oscillatory movement of the wiper element. The wiper blade thus has a lower profile than in the prior art resulting in better wind lift test results. Further, less raw material is used. Preferably, the stop surfaces are formed by the channels. The advantage is that the so-called "reversal noise" of the wiping element during the oscillatory movement is reduced.

United States patent publication no. US2008/0150193 (Walworth et al) discloses a windscreen wiper device. However, the problem of "reversal noise" is not touched upon therein, nor does it teach a solution therefore.

Preferably, the stop surfaces are formed by the channels. The advantage is that the so-called "reversal noise" of the wiping element during the oscillatory movement is reduced.

In a preferred embodiment of a windscreen wiper device in accordance with the invention each channel has an at least substantially V-shaped cross-section. In the alternative, each channel has an at least substantially U-shaped cross-section.

In another preferred embodiment of a windscreen wiper device according to the invention the wiping element consists of two tilting web grooves defining a strip-like tilting web therebetween, as well as a downwardly extending wiping lip on the tilting web, wherein the bottom of the groove and the tilting web are of a substantially W-shaped cross-section.

In another preferred embodiment of a windscreen wiper device according to the invention the groove extends in upward direction above the longitudinal strip for forming a longitudinal hollow channel defined by the longitudinal strip and an upper surface of the groove.

In another preferred embodiment of a windscreen wiper device in accordance with the invention the wiper blade is provided with a spoiler at a side thereof facing away from a windscreen to be wiped.

THE DRAWINGS

Figure 2:
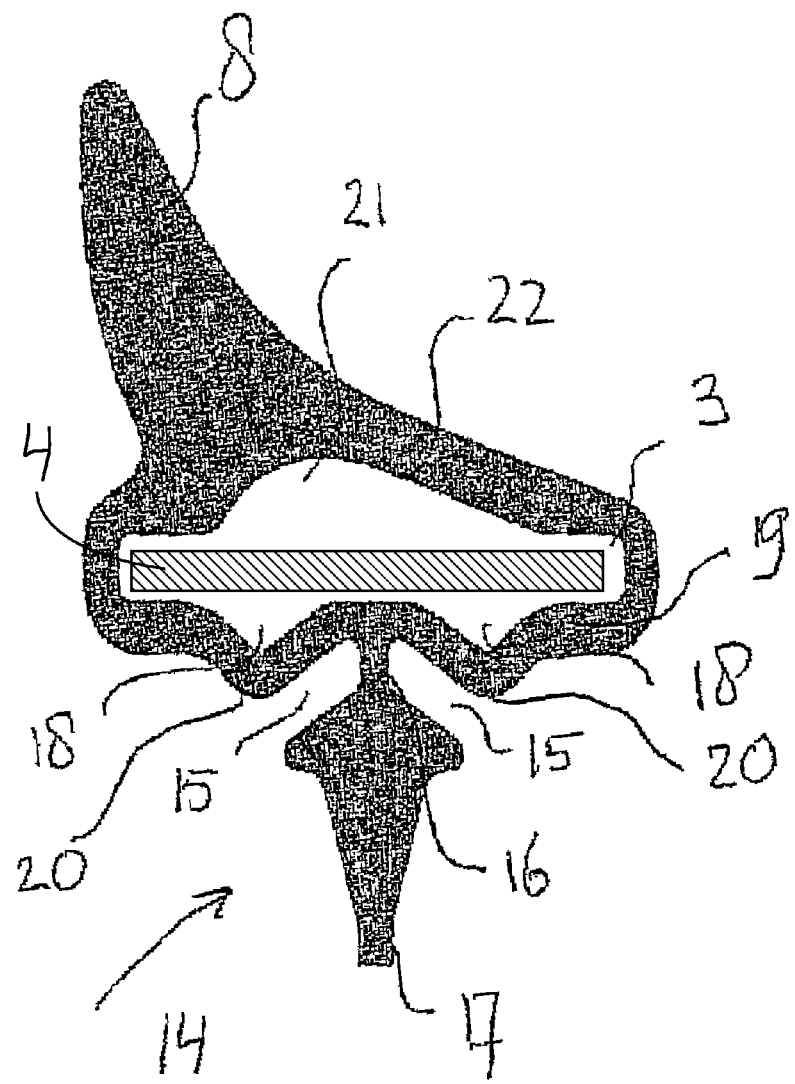

The invention will now be explained more in detail with reference to figures illustrated in a drawing, wherein FIG. 1 is a perspective, schematic view of a preferred embodiment of a windscreen wiper device according to the invention, with and without an oscillating arm, respectively; and FIG. 2 shows a cross-sectional view of a wiper blade 15 as used in a windscreen wiper device of FIG. 1.

DETAILED DESCRIPTION

FIG. 1 shows a preferred variant of a windscreen wiper device I according to the invention. the windscreen wiper device is built up of an elastomeric wiper blade 2 comprising a central or middle longitudinal groove 3, wherein a central or middle longitudinal strip 4 made of spring band steel is fitted in the longitudinal groove 3 (see FIGS. 2 through 5). the strip 4 forms a flexible carrier element for the rubber wiper blade 2, as it were, which is thus biased in a curved position (the curvature in operative position being that of a windscreen to be wiped). An end of the strip 4 and/or an end of the wiper blade 2 is/are connected on either side of the windscreen wiper device 1 to respective connecting pieces or 'end caps" 5. In this embodiment, the connecting pieces 5 are separate constructional elements, which may be form-locked, as well as force-locked to both ends of the strip 4/the wiper blade 2. In another preferred variant, the connecting pieces 5 are in one piece with the strip 4 made of spring band steel. The windscreen wiper device 1 is furthermore built up of a connecting device 6 for connecting an oscillating wiper arm 7 thereto. The oscillating wiper aim 7 is pivotally connected to the connecting device 6 about a pivot axis near one end. The preferred embodiment of FIG. 1 according to the invention comprises a spoiler or "air deflector" 8 which is made in one piece with the rubber wiper blade 2 and which extends along the entire length thereof. The connecting device 6 with the wiper blade 2 is mounted onto the oscillating arm 7 as follows. A joint part 9 being already clipped onto the connecting device 6 is pivoted relative to the connecting device 6, so that the joint part 9 can be easily slided on a free end of the oscillating arm 7. During this sliding movement a resilient tongue 10 of the joint part 9 is initially pushed in against a spring force and then allowed to spring back into the hole 11 of the oscillating arm 7, thus snapping, that is clipping the resilient tongue 10 into the hole 11. This is a so-called bayonet-connection. The oscillating arm 7 together with the joint part 9 may then be pivoted back in a position parallel to the wiper blade 2 in order to be ready for use. By subsequently pushing in again the resilient tongue 10 against the spring force (as if it were a push button), the connecting device 6 and the joint part 9 together with the wiper blade 2 may be released from the oscillating arm 7. Dismounting the connecting device 6 with the wiper blade 2 from the oscillating arm 7 is thus realized by sliding the connecting device 6 and the joint part 9 together with the wiper blade 2 in a direction away from the oscillating arm 7. The connecting device 6 comprises two cylindrical protrusions 12 extending outwards on either side of the connecting device 6. These protrusions 12 pivotally engage in identically shaped cylindrical recesses 13 of the plastic joint part 9. the protrusions 12 act as bearing surfaces at the location of the pivot axis in order to pivot the joint part 9 (and the oscillating arm 7 attached thereto) about the pivot axis near one end of the oscillating arm. 7.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2. With reference to FIG. 2 the wiper blade 2 comprises a wiping element 14. the wiping element 14 consists of two tilting web grooves 15 defining a strip-like tilting web 16 between them, as well as a downwardly extending wiping lip 17 on the tilting web 16. the wiping lip 17 rests with its free end on a windscreen to be wiped. In action the wiping lip 17, as if it were a hinge, tilts in its oscillation reversal positions.

As can be seen in FIG. 2, the central groove 3 extends in downward direction beneath the longitudinal strip 4 for forming two longitudinal hollow channels 18 on opposite sides of the wiping element 14, the channels 18 each being defined by the longitudinal strip 4 and a bottom 19 of the groove 3. the bottom 19 is provided with stop surfaces 20 on opposite sides of the wiping element 14 to limit the oscillatory movement of the wiping element 14 in the second position. In fact, these stop surfaces 20 are formed by bottoms of the downwardly extending channels 18.

the central groove 3 also extends in upward direction above the longitudinal strip 4 for forming a longitudinal hollow channel 21 defined by the longitudinal strip 4 and an upper surface 22 of the groove 3. This is realized for facilitating insertion of the longitudinal strip 4 inside the groove 3 and for reducing the amount of raw material used in order to minimize costs and weight.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper blade of a flexible material, said wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, said groove extends in downward direction beneath the longitudinal strip for forming at least two longitudinal hollow channels on opposite sides of said wiping element, said channels each being defined by said longitudinal strip and a bottom of said groove, wherein said bottom is provided with stop surfaces on opposite sides of said wiping element, wherein said stop surfaces limit an oscillatory movement of said wiping element, wherein said wiping element includes two tilting web grooves which are located on either lateral side of a tilting web and a wiping lip extending downwardly from said tilting web, and wherein the bottom of said central longitudinal groove is of substantially uniform wall thickness and has a generally W-shaped cross-section, and wherein said stop surfaces are formed by bottoms of said downwardly extending channels.

2. A windscreen wiper device according to claim 1, wherein each channel has an at least substantially V-shaped cross-section.

3. A windscreen wiper device according to claim 1, wherein each channel has an at least substantially U-shaped cross-section.

4. A windscreen wiper device according to claim 1, wherein said groove extends in upward direction above the longitudinal strip for forming a longitudinal hollow channel defined by said longitudinal strip and an upper surface of said groove.

5. A windscreen wiper device according to claim 1, wherein said wiper blade is provided with a spoiler at a side thereof facing away from a windscreen to be wiped.

* * * * *